(12) United States Patent
Iley et al.

(10) Patent No.: US 10,606,613 B2
(45) Date of Patent: Mar. 31, 2020

(54) INTEGRATED MAINFRAME DISTRIBUTED ORCHESTRATION TOOL

(71) Applicant: BANK OF AMERICA CORPORATION, Charlotte, NC (US)

(72) Inventors: Dean Alan Iley, Chesapeake, VA (US); Basavaraj Shekarappa Annigeri, West Chester, PA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/994,896

(22) Filed: May 31, 2018

(65) Prior Publication Data

US 2019/0370010 A1    Dec. 5, 2019

(51) Int. Cl.
| | | |
|---|---|---|
| *G06F 8/41* | (2018.01) | |
| *G06F 9/44* | (2018.01) | |
| *G06F 11/36* | (2006.01) | |
| *G06F 9/448* | (2018.01) | |

(52) U.S. Cl.
CPC ............. *G06F 9/448* (2018.02); *G06F 8/41* (2013.01); *G06F 11/3624* (2013.01); *G06F 11/3696* (2013.01)

(58) Field of Classification Search
None
See application file for complete search history.

(56) References Cited

U.S. PATENT DOCUMENTS

| | | |
|---|---|---|
| 5,469,576 A | 11/1995 | Dauerer et al. |
| 5,758,062 A | 5/1998 | McMahon et al. |
| 6,065,017 A | 5/2000 | Barker |
| 6,574,792 B1 | 6/2003 | Easton |
| 6,966,013 B2 | 11/2005 | Blum et al. |
| 7,003,781 B1 | 2/2006 | Blackwell et al. |
| 7,200,626 B1 | 4/2007 | Hoang et al. |
| 7,231,550 B1 | 6/2007 | McGuire et al. |
| 7,376,682 B2 | 5/2008 | Ramacher et al. |
| 7,483,970 B2 | 1/2009 | Anuszczyk et al. |
| 7,917,897 B2 | 3/2011 | Bassin et al. |
| 8,126,848 B2 | 2/2012 | Wagner |
| 8,291,379 B2 | 10/2012 | Krauss et al. |

(Continued)

*Primary Examiner* — S. Sough
*Assistant Examiner* — Cheneca Smith
(74) *Attorney, Agent, or Firm* — Michael A. Spring; Moore & Van Allen PLLC; Anup Shrinivasan Iyer (57) ABSTRACT

Systems, computer program products, and methods are described herein for an integrated mainframe distributed orchestration tool. The present invention is configured to receive an indication that one or more source code modules have been uploaded to a source code repository, wherein receiving the indication automatically triggers a compile operation on an automation server; initiate the compile operation on the automation server, wherein the compile operation comprises transforming the one or more source code modules into one or more standalone software artifacts executable on a mainframe data processor, thereby providing a landing zone for the mainframe data processor; initiate a compile operation of the one or more standalone software artifacts on the mainframe data processor to generate an executable build; and export the executable build to one or more repositories.

18 Claims, 3 Drawing Sheets

(56) References Cited

U.S. PATENT DOCUMENTS

| | | | |
|---|---|---|---|
| 8,418,147 B1* | 4/2013 | Odenwelder | G06F 11/3684 |
| | | | 717/128 |
| 8,561,036 B1 | 10/2013 | Beans et al. | |
| 9,110,751 B2* | 8/2015 | Fisher | G06F 8/41 |
| 2003/0055809 A1 | 3/2003 | Bhat | |
| 2004/0034699 A1 | 2/2004 | Gotz et al. | |
| 2004/0205727 A1 | 10/2004 | Sit et al. | |
| 2005/0097149 A1 | 5/2005 | Vaitzblit et al. | |
| 2005/0144526 A1 | 6/2005 | Banko | |
| 2007/0038896 A1 | 2/2007 | Champlin et al. | |
| 2008/0109790 A1 | 5/2008 | Farnham et al. | |
| 2011/0138373 A1* | 6/2011 | Lane | G06F 8/443 |
| | | | 717/157 |
| 2013/0174124 A1* | 7/2013 | Watters | G06F 8/71 |
| | | | 717/122 |
| 2013/0212567 A1* | 8/2013 | Fisher | G06F 8/41 |
| | | | 717/140 |
| 2014/0040871 A1* | 2/2014 | Schwan | G06F 8/71 |
| | | | 717/141 |
| 2015/0052108 A1 | 2/2015 | Volk et al. | |

* cited by examiner

INTEGRATED MAINFRAME DISTRIBUTED ORCHESTRATION TOOL

FIELD OF THE INVENTION

The present invention embraces a system for integrated mainframe distributed orchestration.

BACKGROUND

DevOps is the process of bringing software development and operations together to share processes and procedures. The goal is to reduce the risk of change and improve the speed of application development and deployment. This requires collaboration across the groups responsible from the analyst, through development, test, quality assurance, and operations. While many new applications are developed in a distributed network environment, many legacy applications are designed for operation, maintenance, and reprogramming within a mainframe environment. Many of the latest software development tools, however, are not designed for the mainframe environment. As such, software maintenance and development of mainframe applications do not typically have the benefit of these newer software development tools. Many business functions leverage components in both distributed and mainframe environments thus driving a need to bridge the gap between distributed network and mainframe environments, so that the software development and testing tools can be applied in concert across environments with common context for a single deployment.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for integrated mainframe distributed orchestration is presented. The system comprising at least one non-transitory storage device; and at least one processing device coupled to the at least one non-transitory storage device, wherein the at least one processing device is configured to: receive an indication that one or more source code modules have been uploaded to a source code repository, wherein receiving the indication automatically triggers a compile operation on an automation server; initiate the compile operation on the automation server, wherein the compile operation comprises transforming the one or more source code modules into one or more standalone software artifacts executable on a mainframe data processor, thereby providing a landing zone for the mainframe data processor; initiate a compile operation of the one or more standalone software artifacts on the mainframe data processor to generate an executable build; and export the executable build to one or more repositories.

In some embodiments, the at least one processing device is further configured to initiate an automated code scan on the one or more source code modules in response to receiving the indication that the one or more source code modules have been uploaded to the source code repository.

In some embodiments, the automated code scan performs an inspection of the one or more source code modules with static and dynamic analysis of code to detect bugs, code smells, and security exposure.

In some embodiments, the at least one processing device is further configured to retrieve the executable build from the one or more repositories; and execute the executable build on one or more test machines.

In some embodiments, the at least one processing device is further configured to receive an indication that the executable build has been exported into the one or more repositories; and trigger an automated test subroutine based on at least receiving the indication that the executable build has been exported into the one or more repositories, wherein the automated test subroutine is configured to automatically execute the executable build on the one or more test machines.

In some embodiments, the at least one processing device is further configured to initiate a scan on the one or more source code modules for one or more scope changes; determine one or more scope changes based on at least the scan; determine one or more work items based on at least determining the one or more scope changes; and transmit control signals configured to cause a user device associated with a user to display the one or more scope changes and the one or more work items associated with the one or more scope changes.

In some embodiments, the at least one processing device is further configured to receive from the user device, one or more source code modules associated with the one or more scope changes; and upload the one or more source code modules associated with the one or more scope changes to the source code repository.

In some embodiments, the at least one processing device is further configured to schedule a deployment of the executable build to one or more nodes associated with the mainframe data processor.

In some embodiments, the at least one processing device is further configured to determine a location of the one or more nodes; and deploy the executable build to the one or more nodes associated with the mainframe data processor based on at least determining the location of the one or more nodes, wherein deploying further comprises deploying the executable build as a secure software package to enable secure system administration and file transfer.

In another aspect, a computer implemented method for integrated mainframe distributed orchestration is presented. The method comprising: receiving an indication that one or more source code modules have been uploaded to a source code repository, wherein receiving the indication automatically triggers a compile operation on an automation server; initiating the compile operation on the automation server, wherein the compile operation comprises transforming the one or more source code modules into one or more standalone software artifacts executable on a mainframe data processor, thereby providing a landing zone for the mainframe data processor; initiating a compile operation, on the mainframe data processor, of the one or more standalone software artifacts to generate an executable build; and exporting the executable build to one or more repositories.

In yet another aspect, a computer program product for integrated mainframe distributed orchestration is presented. The computer program product comprising a non-transitory computer-readable medium comprising code causing a first apparatus to: receive an indication that one or more source code modules have been uploaded to a source code repository, wherein receiving the indication automatically triggers a compile operation on an automation server; initiate the compile operation on the automation server, wherein the compile operation comprises transforming the one or more source code modules into one or more standalone software artifacts executable on a mainframe data processor, thereby providing a landing zone for the mainframe data processor; initiate a compile operation of the one or more standalone software artifacts on the mainframe data processor to generate an executable build; and export the executable build to one or more repositories.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. In some embodiments, a "user" may be an employee (e.g., a developer, a coder, an architect, an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

Figure 1:
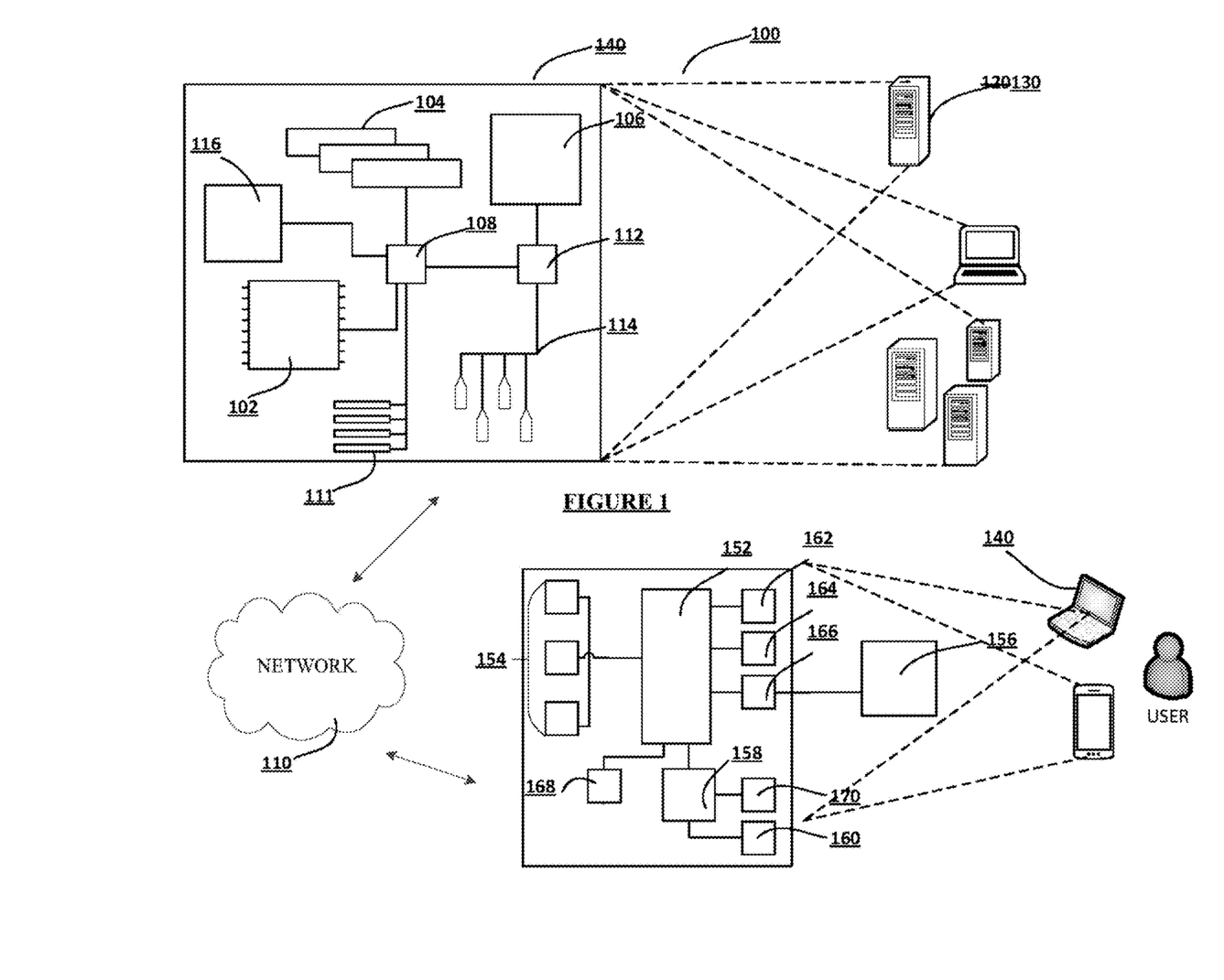
FIG. 1 presents an exemplary block diagram of the system environment for integrated mainframe distributed orchestration tool, in accordance with an embodiment of the invention.

FIG. 1 presents an exemplary block diagram of the system environment for integrated mainframe distributed orchestration tool 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to develop and push source code to one or more other devices (not shown) within the system environment, and/or execute one or more applications stored thereon. The one or more applications may be configured to communicate with the one or more other devices, including the system 130. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 1408 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130, and one or more other devices within the system environment. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment

100 may be combined into a single portion. Likewise, in some embodiments, some or all of the portions of the system 130 may be separated into two or more distinct portions.

Mainframe data processors remain critical for managing mobile loads, testing and payment processing. Entities need the reliability, security, and processing power that mainframe data processors provide in a mobile-first world. Software development on mainframe data processors are often implemented using manual and traditional processes. Each enhancement depends heavily on the business and small changes in business requirements that can upset timelines and create significant code rework. This results in longer response time for business/user changes and, eventually, delayed time-to-market. Most mainframe data processors lack the capabilities to deliver automation. In the absence of automation, coordination between development, operations and testing environments is non-existent, or at best, tedious. As a result, business teams suffer, leading to lengthy software development lifecycles. The active software development life cycle for mainframe applications is rooted in proprietary tooling, in a closed ecosystem, operating as a parallel pipeline to distributed application development. As Agile teams mature their work management and delivery plans, mainframe application development will be challenged to integrate across platforms at a velocity that demands concurrent development of mainframe components. The current tooling is inadequate for integrated, multi-branch development. In addition, mainframe applications have been modified many times over decades sprawling beyond original purposes and becoming more complex thus there is also a need for discovery and guidance to onboard new resources as well as align to Agile features.

DevOps is the process of bringing development and operations together to share processes and procedures. The goal is to reduce the risk of change and improve the speed of deployment. This requires true collaboration across the groups responsible from the business analyst, through development, test, quality assurance, and operations. The present invention provides the functional benefit of integrating the software development lifecycle in mainframe data processors with the DevOps workflow, thereby migrating mainframe test environments to distributed test environments. In doing so, the present invention wraps the DevOps platform in familiar mainframe work stations, thus easing the technology transition from a legacy system to newer development tools.

Figure 2:
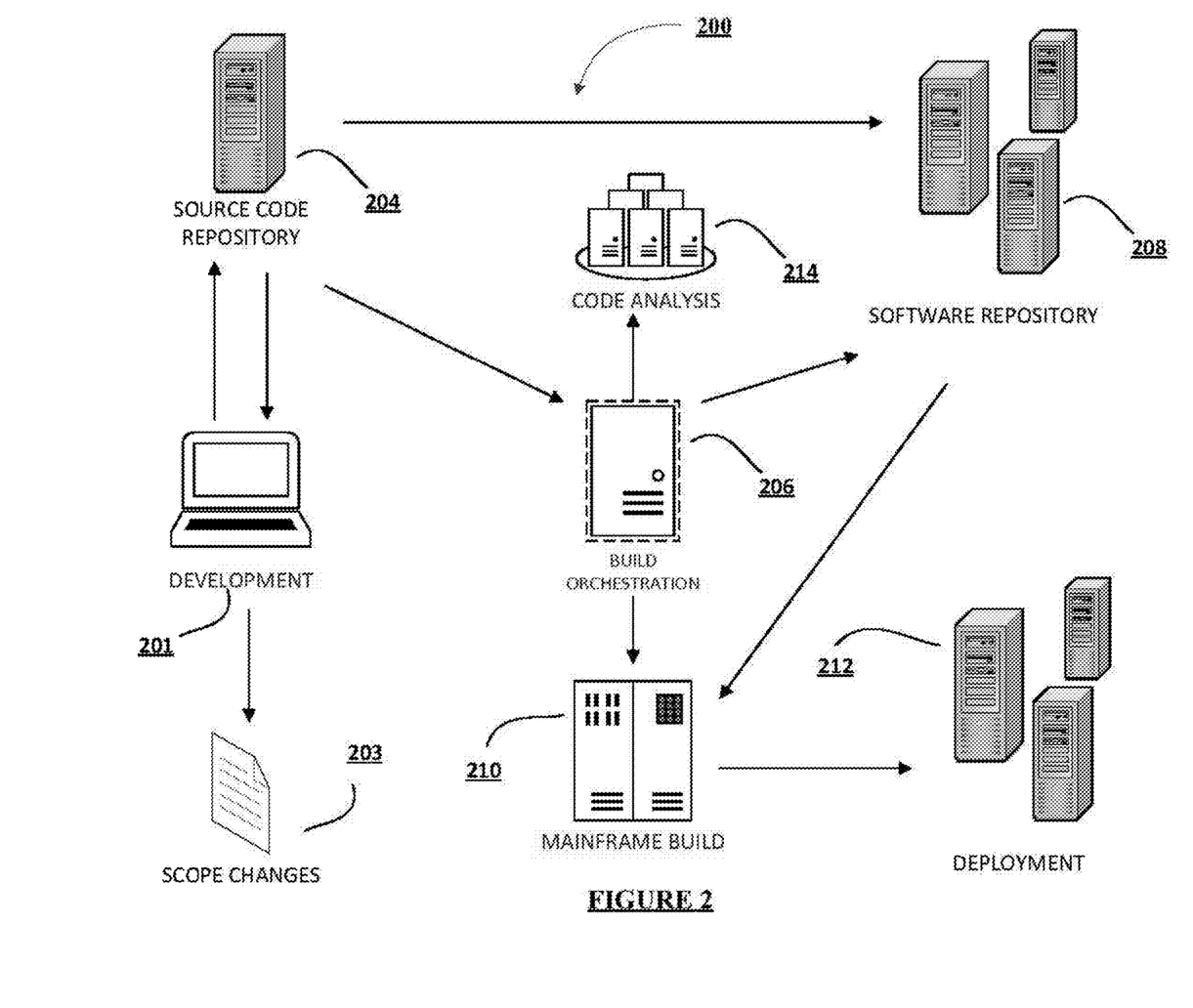
FIG. 2 illustrates a high level DevOps workflow integrating the functionality of a mainframe within a distributed development environment, in accordance with an embodiment of the invention.

FIG. 2 illustrates a high level DevOps workflow integrating the functionality of a mainframe within a distributed development environment 200, in accordance with an embodiment of the invention. As shown in FIG. 2, in the development phase 201, a user may generate source code using a text editor, a visual programming tool, or an integrated development environment (IDE). In this regard, the user may operate a user input system 140 to execute one or more applications stored thereon to generate the source code. In a large program development environment, there are often management systems that help developers separate and keep track of various states and levels of source code files. In response to generating the source code, the workflow includes pushing the source code to be stored in a source code repository 204. The source code repository 204 is a file archive and a web hosting facility where large amounts of source code, for software or for web pages, is stored, either publicly or privately. In some embodiments, the source code repository 204 may be a version control system. In version control systems, depending on whether such a system in use is distributed or centralized, the entirety of the information in the repository may be duplicated on every user's system or may be maintained on one or more servers. In some embodiments, the source code repository may include, among other things, a historical record of changes in the repository 204 and the source code modules loaded thereon.

In some embodiments, accessing the source code repository 204 may require user authentication. In some embodiments, the user may be required to authenticate identity for access to an application on the user input system 140, a mobile device or for access to a particular feature, function or action of an application, or in this case, access to the source code repository 204. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication. The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

Typically, a developer generates source code based on a predefined project scope. A project scope defines one or more deliverables that need to be addressed to successfully deliver a product, service, or result. It is not uncommon for a project scope or deliverable to change during the development phase of the application lifecycle. In such a scenario, the distributed development nature of the application development process integrates these scope changes 203 into the workflow. Based on these scope changes, new work items are defined 205, which are then presented to the user as modified or new deliverables. In response, the user may then generate additional source code based on these work items and push the additional source code to be stored in a source code repository 204.

In response to loading the one or more source code modules on the source code repository 204, the workflow initiates the build orchestration 206, whereby the application development process proceeds by building software as a collection of microservices—small and relatively simple features that can be combined into several different applications. In this regard, the build orchestration 206 retrieves source code modules from the source code repositories 204, open source, third party sites, and other locations into a coherent package of software. Build orchestration 206 offers an effective way to set up continuous integration or continuous delivery for almost any combination of programming languages and source code repositories using pipelines, as well as automating other routine development tasks. In doing so, the build orchestration 206 provides a faster and more robust way to integrate the entire chain of build, test, and deployment tools to generate a standalone software artifact capable of being executed on the mainframe data processor.

Build orchestration 206 can be triggered by various means. In some embodiments the build orchestration 206 can be triggered using a time-based job scheduler to run periodically at fixed times, dates, or intervals. This automates the build process to effectively accomplish repetitive build tasks. In some other embodiments, the build orchestration 206 can be triggered based on the latest changes to at least a part of the source code to the source code repository 204. In yet another embodiment, the build orchestration 206 may be triggered using a pipeline manager service. The pipeline manager service may employ various rules or principles for selecting source code modules from the pipeline queue for execution. For example, the pipeline manager service may select source code modules from the pipeline queue based on first in first out (FIFO), last in first out (LIFO), expected processing time (e.g., source code modules with shorted expected processing times may be selected over source code modules with longer expected processing times), priority (e.g., certain source code modules may be prioritized over others), and/or other rules or principles for selecting source code modules from a queue.

Once the build orchestration is complete, the standalone software artifact is then published to software repository 208 for deployment and reuse. The software repository 208 includes common reusable components (e.g., cpy, ctl, jcl, prc, src, or the like) and is capable of versioning and is searchable using metadata. Once the standalone software artifact is stored in the software repository 208, it is then configured to be retrieved by the mainframe build 210 to be complied and executed on the mainframe data processor. In response, the standalone software artifact is then prepared for deployment 212. In some embodiments, the workflow embraces continuous delivery by frequently delivering updates to the standalone software artifact for execution and deployment.

Figure 3:
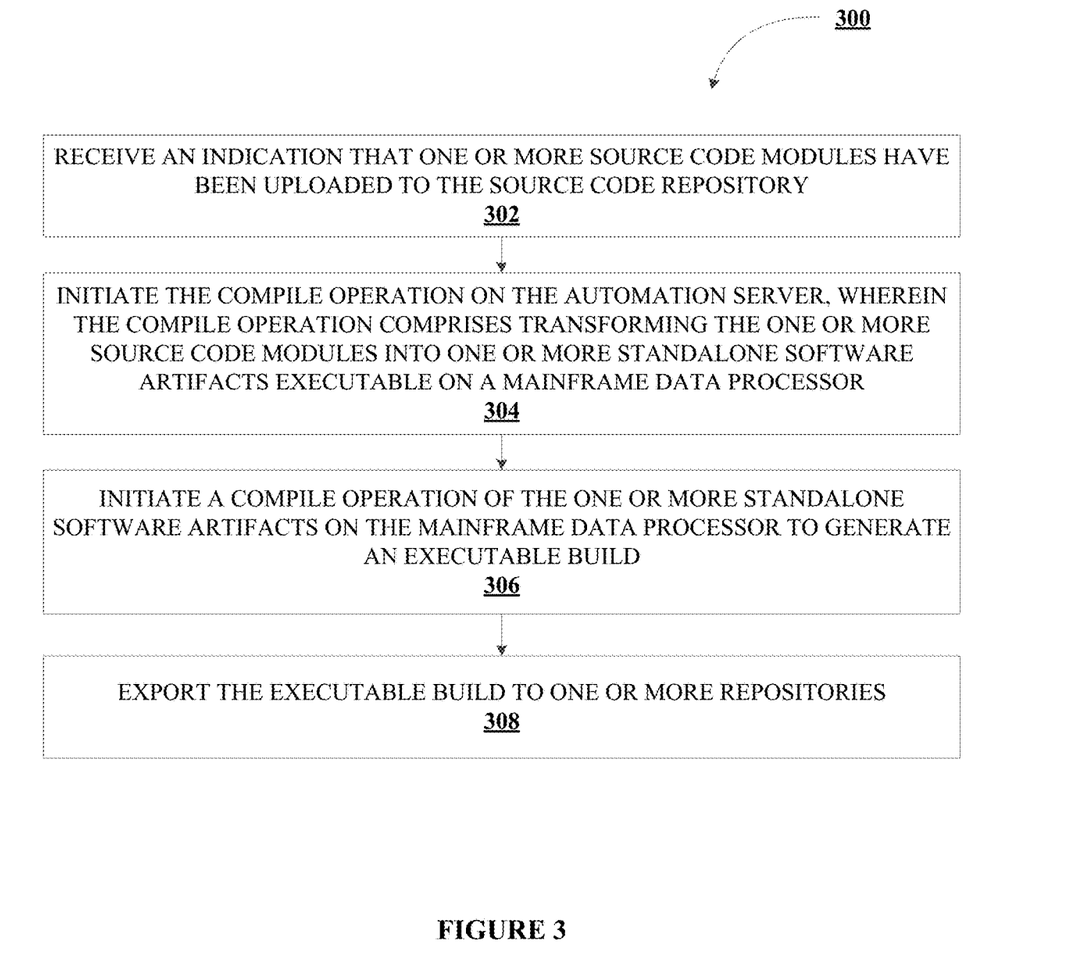
FIG. 3 illustrates a process flow for integrated mainframe distributed orchestration tool, in accordance with an embodiment of the invention.

FIG. 3 illustrates a process flow for integrated mainframe distributed orchestration tool 300, in accordance with an embodiment of the invention. As shown in block 302, the process flow includes receiving an indication that one or more source code modules have been uploaded to the source code repository. In some embodiments, the system may be configured to initiate an automated code scan on the one or more source code modules in response to receiving the indication that the one or more source code modules have been uploaded to the source code repository. In this regard, the automated code scan performs an inspection of the one or more source code modules with static and dynamic analysis of code to detect bugs, code smells, and security exposure. In addition, the automated code scan ensure source code compliance with one or more internal and/or external compliance standards and practices associated with the entity.

In some embodiments, the system may be configured to receive one or more scope changes from an external server. As defined herein, scope refers to the detailed set of deliverables or features of a project. These deliverables are typically derived from a project's requirements. In other words, scope may be defined as the work that needs to be accomplished to deliver a product, service, or result with the specified features and functions. However, a scope of the project may change during the development process. Such scope changes are received from an external server, typically associated with a project manager. In response to receiving the scope change, the system may be configured to determine one or more work items associated with the one or more scope changes. In one aspect, the one or more work items include a listing of items to be produced or tasks to be done to the required quantity, quality, and variety, in the time allotted and with the resources available and agreed upon.

In response to determining the one or more work items, the system may be configured to transmit control signals configured to cause a user device associated with a user to display the one or more scope changes and the one or more work items associated with the one or more scope changes. The user may then generate source code based on the one or more work items. The system may then be configured to receive from the user device, one or more source code modules associated with the one or more scope changes. In response, the system may be configured to upload the one or more source code modules associated with the one or more scope changes to the source code repository.

In response, process flow includes initiating the compile operation on the automated server, wherein the compile operation comprises transforming the one or more source code modules into one or more standalone software artifacts executable on a mainframe data processor, as shown in block 304. In some embodiments, the one or more source code modules are converted into an intermediate language capable of representing machine level, functional programs, procedural programs, as well as object oriented programs. In this regard, the system may be configured to parse the one or more source code modules to determine its structure. In one aspect, the structure of the one or more source code modules includes variable names, function/method names, function overloading/overriding, and additional information that may aid in the resolution of any ambiguity in the source code modules. This structure may then be optimized to remove redundancy and replace certain codes with optimal equivalents. In some embodiments, larger source code modules are divided into smaller modules, where each of the smaller modules are processed individually and combined while later combining the source code modules into the standalone software artifact capable of being executed on the mainframe data processor. Having transformed the source code modules into an intermediate language, the system is then configured to convert the intermediate language into a standalone software artifact capable of being executed on a mainframe data processor. In some other embodiments, the one or more source code modules may be transformed directly into a standalone software artifact capable of being executed on a mainframe data processor.

Next, the process flow includes initiating a compile operation of the one or more standalone software artifacts on the mainframe data processor to generate an executable build, as shown in block 306. Once the executable build is generated, the process flow includes exporting the executable build to one or more repositories, as shown in block 308. In some embodiments, the system may be configured to retrieve the executable build from the one or more repositories, and in response, execute the executable build on one or more test machines. In one aspect, the system may be configured to schedule a deployment of the executable build to one or more nodes associated with the mainframe data processor. In this regard, the system may be configured to determine a location of the one or more nodes. Once the location of the one or more nodes are determined, the system may then be configured to deploy the executable build to the one or more nodes associated with the mainframe data processor. In some embodiments, the executable build may be deployed on multiple nodes simultaneously. In this regard, the executable build is deployed as a secure software package to enable secure system administration and file transfer.

In some embodiments, the system may be configured to automate the testing procedure. In this regard, the system may be configured to receive an indication that the executable build has been exported into the one or more repositories. In response, the system may be configured to trigger an automated test subroutine based on at least receiving the indication that the executable build has been exported into the one or more repositories, wherein the automated test subroutine is configured to automatically execute the executable build on the one or more test machines.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A computer implemented method for integrated mainframe distributed orchestration, the method comprising:

receiving an indication that one or more source code modules have been uploaded to a source code repository, wherein receiving the indication automatically triggers a compile operation on an automation server;

dividing each of the one or more source code modules into one or more sub-divided source code modules;

initiating the compile operation on the automation server, wherein the compile operation comprises transforming the one or more sub-divided source code modules into one or more standalone software artifacts executable on the mainframe data processor, thereby providing a landing zone for the mainframe data processor, wherein transforming further comprises converting the one or more sub-divided source code modules into an intermediate language capable of representing machine level, functional, procedural, and object oriented programs, wherein converting further comprises parsing the one or more sub-divided source code modules to determine a structure associated with the one or more sub-divided source code modules, wherein the structure comprises variable names, function/method names, function overloading/overriding, and additional information capable of resolving any ambiguity in the one or more sub-divided source code modules;

optimizing the structure of the one or more sub-divided source code modules to remove redundancy, wherein optimizing further comprises replacing at least a portion of a code associated with the one or more sub-divided source code modules with optimal code equivalents;

combining the one or more optimized sub-divided source code modules into one or more optimized source code modules;

converting the one or more optimized source code modules from the intermediate language into the one or more standalone artifacts capable of being executed on the mainframe data processor;

initiating a compile operation of the one or more standalone software artifacts on the mainframe data processor to generate an executable build;

exporting the executable build to one or more repositories;

receiving one or more scope changes from an external server;

determining one or more work items based on at least determining the one or more scope changes; and transmitting control signals configured to cause a user device associated with a user to display the one or more scope changes and the one or more work items associated with the one or more scope changes.

2. The method of claim 1, wherein the method further comprises:

initiating an automated code scan on the one or more source code modules in response to receiving the indication that the one or more source code modules have been uploaded to the source code repository.

3. The method of claim 2, wherein the automated code scan performs an inspection of the one or more source code modules with static and dynamic analysis of code to detect bugs, code smells, and security exposure.

4. The method of claim 1, wherein the method further comprises:

retrieving the executable build from the one or more repositories; and executing the executable build on one or more test machines.

5. The method of claim 4, wherein the method further comprises:

receiving an indication that the executable build has been exported into the one or more repositories; and triggering an automated test subroutine based on at least receiving the indication that the executable build has been exported into the one or more repositories, wherein the automated test subroutine is configured to automatically execute the executable build on the one or more test machines.

6. The method of claim 1, wherein the method further comprises:

receiving from the user device, one or more source code modules associated with the one or more scope changes; and uploading the one or more source code modules associated with the one or more scope changes to the source code repository.

7. The method of claim 1, wherein the method further comprises scheduling a deployment of the executable build to one or more nodes associated with the mainframe data processor.

8. The method of claim 7, wherein the method further comprises:

determine a location of the one or more nodes; and deploy the executable build to the one or more nodes associated with the mainframe data processor based on at least determining the location of the one or more nodes, wherein deploying further comprises deploying the executable build as a secure software package to enable secure system administration and file transfer.

9. A system for integrated mainframe distributed orchestration, the system comprising:

at least one non-transitory storage device; and at least one processing device coupled to the at least one non-transitory storage device, wherein the at least one processing device is configured to:

receive an indication that one or more source code modules have been uploaded to a source code repository, wherein receiving the indication automatically triggers a compile operation on an automation server;

divide each of the one or more source code modules into one or more sub-divided source code modules;

initiate the compile operation on the automation server, wherein the compile operation comprises transforming the one or more sub-divided source code modules into one or more standalone software artifacts executable on the mainframe data processor, thereby providing a landing zone for the mainframe data processor, wherein transforming further comprises converting the one or more sub-divided source code modules into an intermediate language capable of representing machine level, functional, procedural, and object oriented programs, wherein converting further comprises parsing the one or more sub-divided source code modules to determine a structure associated with the one or more sub-divided source code modules, wherein the structure comprises variable names, function/method names, function overloading/overriding, and additional information capable of resolving any ambiguity in the one or more sub-divided source code modules;

optimize the structure of the one or more sub-divided source code modules to remove redundancy, wherein optimizing further comprises replacing at least a portion of a code associated with the one or more sub-divided source code modules with optimal code equivalents;

combine the one or more optimized sub-divided source code modules into one or more optimized source code modules;

convert the one or more optimized source code modules from the intermediate language into the one or more standalone artifacts capable of being executed on the mainframe data processor;

initiate a compile operation of the one or more standalone software artifacts on the mainframe data processor to generate an executable build;

export the executable build to one or more repositories;

receive one or more scope changes from an external server;

determine one or more work items based on at least determining the one or more scope changes; and transmit control signals configured to cause a user device associated with a user to display the one or more scope changes and the one or more work items associated with the one or more scope changes.

10. The system of claim 9, wherein the at least one processing device is further configured to:

initiate an automated code scan on the one or more source code modules in response to receiving the indication that the one or more source code modules have been uploaded to the source code repository.

11. The system of claim 10, wherein the automated code scan performs an inspection of the one or more source code modules with static and dynamic analysis of code to detect bugs, code smells, and security exposure.

12. The system of claim 9, wherein the at least one processing device is further configured to:

retrieve the executable build from the one or more repositories; and execute the executable build on one or more test machines.

13. The system of claim 12, wherein the at least one processing device is further configured to:

receive an indication that the executable build has been exported into the one or more repositories; and trigger an automated test subroutine based on at least receiving the indication that the executable build has been exported into the one or more repositories, wherein the automated test subroutine is configured to automatically execute the executable build on the one or more test machines.

14. The system of claim 9, wherein the at least one processing device is further configured to:

receive from the user device, one or more source code modules associated with the one or more scope changes; and upload the one or more source code modules associated with the one or more scope changes to the source code repository.

15. The system of claim 9, wherein the at least one processing device is further configured to schedule a deployment of the executable build to one or more nodes associated with the mainframe data processor.

16. The system of claim 15, wherein the at least one processing device is further configured to:

determine a location of the one or more nodes; and deploy the executable build to the one or more nodes associated with the mainframe data processor based on at least determining the location of the one or more nodes, wherein deploying further comprises deploying the executable build as a secure software package to enable secure system administration and file transfer.

17. A computer program product for integrated mainframe distributed orchestration, the computer program product comprising a non-transitory computer-readable medium storing code causing a first apparatus to:

receive an indication that one or more source code modules have been uploaded to a source code repository, wherein receiving the indication automatically triggers a compile operation on an automation server;

divide each of the one or more source code modules into one or more sub-divided source code modules;

initiate the compile operation on the automation server, wherein the compile operation comprises transforming the one or more sub-divided source code modules into one or more standalone software artifacts executable on the mainframe data processor, thereby providing a landing zone for the mainframe data processor, wherein transforming further comprises converting the one or more sub-divided source code modules into an intermediate language capable of representing machine level, functional, procedural, and object oriented programs, wherein converting further comprises parsing the one or more sub-divided source code modules to determine a structure associated with the one or more sub-divided source code modules, wherein the structure comprises variable names, function/method names, function overloading/overriding, and additional information capable of resolving any ambiguity in the one or more sub-divided source code modules;

optimize the structure of the one or more sub-divided source code modules to remove redundancy, wherein optimizing further comprises replacing at least a portion of a code associated with the one or more sub-divided source code modules with optimal code equivalents, combine the one or more optimized sub-divided source code modules into one or more optimized source code modules;

convert the one or more optimized source code modules from the intermediate language into the one or more standalone artifacts capable of being executed on the mainframe data processor;

initiate a compile operation of the one or more standalone software artifacts on the mainframe data processor to generate an executable build;

export the executable build to one or more repositories;

receive one or more scope changes from an external server;

determine one or more work items based on at least determining the one or more scope changes; and transmit control signals configured to cause a user device associated with a user to display the one or more scope changes and the one or more work items associated with the one or more scope changes.

18. The computer program product of claim 17, wherein the first apparatus is further configured to:

initiate an automated code scan on the one or more source code modules in response to receiving the indication that the one or more source code modules have been uploaded to the source code repository.

* * * * *